Figure 1:
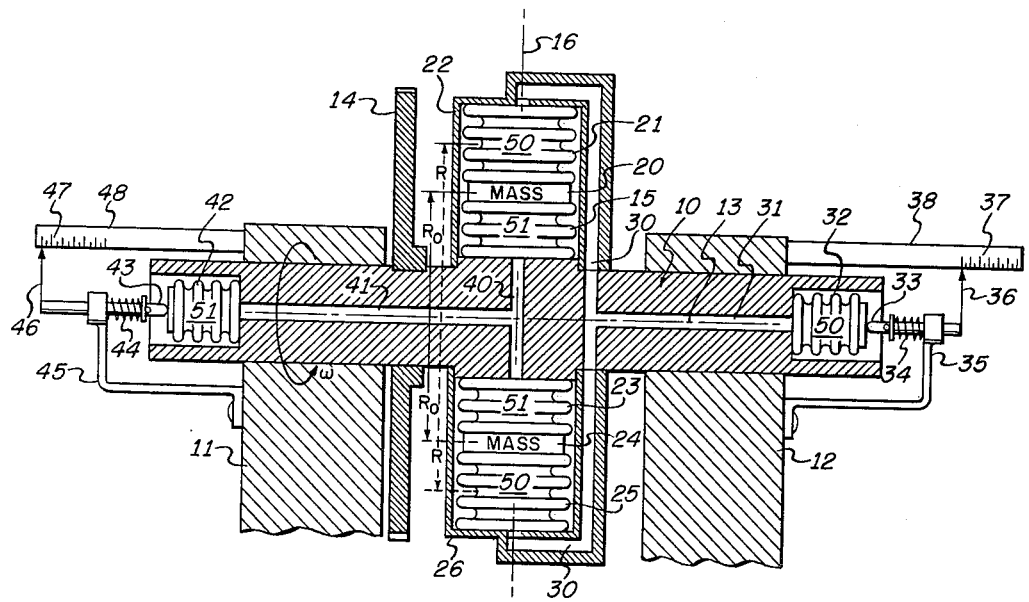

March 6, 1962 W. F. CLEMENT ET AL 3,023,625
ANGULAR VELOCITY SENSOR
Filed Feb. 29, 1960

INVENTORS
WARREN F. CLEMENT
HARRY A. RINTOUL
BY
ATTORNEY

United States Patent Office 3,023,625
Patented Mar. 6, 1962

3,023,625
ANGULAR VELOCITY SENSOR
Warren F. Clement, Glen Head, and Harry A. Rintoul, Freeport, N.Y., assignors to Sperry Rand Corporation, Great Neck, N.Y., a corporation of Delaware
Filed Feb. 29, 1960, Ser. No. 11,660
3 Claims. (Cl. 73—502)

This invention relates to an angular velocity signal generator for detecting the angular velocity of a rotating member.

The present invention is adapted to accurately measure the angular velocity of rotating members where the angular velocity signal generator is subjected to high temperature and high radiation effects which environment is detrimental to known angular velocity signal generators. The preferred embodiment of the invention is primarily of a pneumatic type which does not have rotary fluid seals which tend to leak particularly under high speed and high pressure operation.

A primary object of the present invention is to provide a simple self-contained angular velocity generator for detecting the angular velocity of a rotating member.

Another object of the present invention is to provide an angular velocity signal generator for detecting the angular velocity of a rotating member which eliminates the problems of rotary seals.

The above objects are achieved by providing an angular velocity signal generator for detecting the angular velocity of a rotating member having a mass rotating with the member for producing a centrifugal force proportional to the square of the angular velocity of the member. Expansible containing means, for example, a bellows has one end fixed to the member and another movable end connected to the mass. A fluid within the containing means produces a pressure on the mass that results in a force equal and opposite to the centrifugal force. Pressure responsive means responsive to the pressure produced provides a signal representative of a function of the angular velocity of the member.

Figure 2:
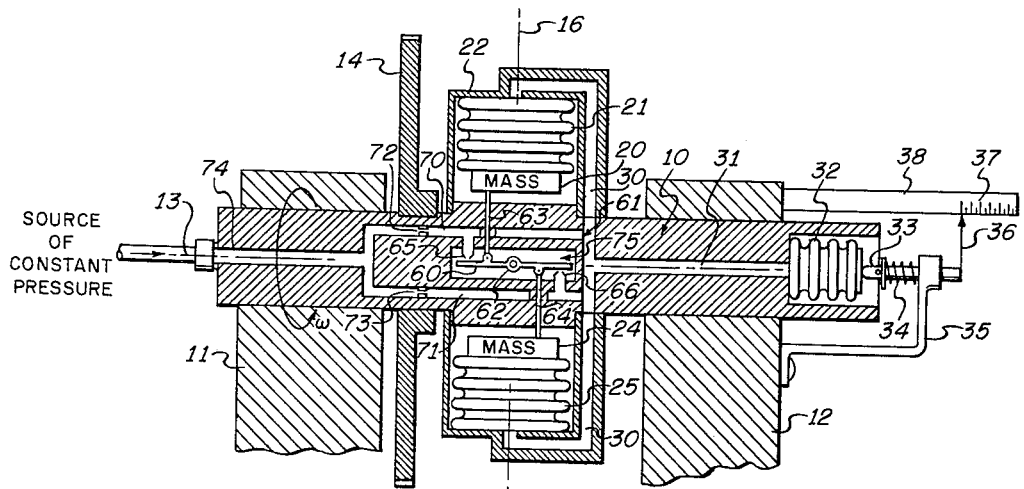

Referring now to the drawings,

FIG. 1 is a schematic view of a preferred embodiment of an angular velocity signal generator applied to a rotating shaft; and FIG. 2 is an alternative embodiment of an angular velocity signal generator applied to a rotating shaft.

Referring to FIG. 1, a shaft 10 is journalled in a pair of spaced bearing supports 11 and 12 respectively, for rotation at an angular speed $\omega$ about an axis 13 by means of gearing 14 which in turn is connected to a power source not shown. A bellows 15 has its fixed end connected to the rotating shaft 10 preferably at a raised flattened portion of the shaft 10. The bellows 15 extends radially from the shaft 10 and has its longitudinal axis 16 perpendicular with respect to the axis 13. The movable end of the bellows 15 is connected to one side of the mass 20. The other side of the mass 20 is connected to the movable end of a bellows 21 which also extends radially with respect to the shaft 10 and preferably has its longitudinal axis coincident with the axis 16. The fixed end of the bellows 21 is mounted on a housing 22 which encloses the bellows 15, the mass 20 and the bellows 21. The housing 22 is connected to the shaft 10. One side of the mass 20 forms the closure for the movable end of the bellows 15. The other side of the mass 20 forms the closure for the movable end of the bellows 21 while its fixed end is enclosed by the housing 22. Alternatively, the bellows 15 and 21 may be completely enclosed except for the conduits communicating therewith with the mass 20 connected to the movable ends thereof or the mass 20 may form a portion of or the complete closure for the movable ends.

A second bellows arrangement is diametrically opposed from the above described bellows arrangement and similar thereto. It is mounted on the shaft 10, spaced 180° from the first bellows assembly. The second bellows assembly comprises a bellows 23, a mass 24, a bellows 25 and a housing 26 all mounted preferably with their longitudinal axes concentric with the axis 16 as described above with respect to the first bellows assembly. A conduit 30 connects the interior of the bellows 21 with the interior of the bellows 25. A conduit 31 connects the conduit 30 with the interior of a bellows 32. Preferably, the conduit 31 is drilled within the shaft 10 concentric with the axis 13 while the bellows 32 has its longitudinal axis concentric with the axis 13 and is mounted in a hollow portion of an extremity of the shaft 10 for rotation therewith. The fixed end of the bellows is connected to the shaft 10 and connects to the conduit 31. The movable end of the bellows 32 is enclosed and cooperates with a spring biased pin 33. The pin 33 is resiliently held against the movable end of the bellows 32 at the center thereof by means of a helical spring 34. The pin 33 is mounted in a support 35 which in turn is connected to the bearing support 12. The pin 33 is prevented from rotating with the shaft 10 by means of a key way or other arrangement not shown. A pointer 36 is connected to the pin 33 and movable with respect to a graduated scale 37 on an arm 38 which is connected to the bearing support 12. The pointer 36 is cooperative with the scale 37 to provide an indication of the square of the angular velocity of the shaft 10 as a function of the position of the movable end of the bellows 32 in a manner to be more fully explained.

A conduit 40 drilled through the shaft 10 connects the interior of the bellows 15 with the interior of the bellows 23. A conduit 41 drilled through the shaft 10 preferably concentric with the axis 13 connects the conduit 40 to the interior of a bellows 42. The bellows 42 preferably is mounted within a hollow portion of an extremity of the shaft 10 in a manner similar to that described with respect to the bellows 32. The movable end of the bellows 42 cooperates with a spring biased pin 43 having a helical spring 44 in a manner similar to that described with respect to pin 33. The pin 43 is mounted in a support 45 that is connected to the bearing support 11. A pointer 46 is mounted on the pin 43 and cooperates with a graduated scale 47 on arm 48 that is connected to the bearing support 11 to provide a signal representative of the square of the angular velocity of the shaft 10 in accordance with the deflection of the bellows 42 in a manner to be more fully described.

The volume enclosed by the bellows 21, 25 and 32 and the conduits 30 and 31 is filled with a pressurized compressible fluid 50 while the volume enclosed by the bellows 15, 23 and 42 and the conduits 40 and 41 is also filled with a pressurized compressible fluid 51.

In the operation of the device of FIG. 1 as the shaft 10 increases its angular velocity to an angular velocity $\omega$, the masses 20 and 24, due to centrifugal force which is proportional to the square of the angular velocity of the shaft 10, move outwardly from an initial position $R_0$ to a position R. This outward radial movement of the masses 20 and 24 performs work on the enclosed fluid volumes reducing the volume of the bellows 21 and 25 thereby compressing the fluid 50 and increasing its pressure proportionately. The increased pressure of the fluid 50 in the bellows 21 and 25 is communicated to the bellows 32 by means of the conduits 30 and 31 and causes the bellows 32 to expand which results in movement of the pin 33 to the right as viewed in the drawing. In the steady state condition, the pointer 36 provides an indication with respect to the scale 37 of the square of the angular velocity of the shaft 10. The scale 37 may also be graduated to provide a direct reading of the angular velocity of the shaft 10.

The outward radial movement of the masses 20 and 24 simultaneously causes expansion of the bellows 15 and 23 resulting in decreasing the pressure of the fluid 51. The decreased pressure of the fluid 51 in the bellows 15 and 23 is communicated to the bellows 42 by means of the conduits 40 and 41 causing contraction of the bellows 42. Due to the resilient action of the spring 44, the pin 43 moves to the right as viewed in the drawing and continues to abut against the movable end of the bellows 42. The pointer 46 in cooperation with the scale 47 provides a measure of the square of the angular velocity of the shaft 10 or with the scale 47 properly calibrated the angular velocity of the shaft 10 may be read directly.

The sensitivity of the angular velocity signal generator shown in FIG. 1 depends upon the character of the fluids 50 and 51, particularly their effective spring constants and the resiliency of the bellows and springs.

Although in the preferred embodiment shown in FIG. 1 a pair of signals are obtainable, it will be appreciated, alternative embodiments may provide an output based on the pressure of the fluid 50 or the fluid 51 or the sum of the differential pressures of the fluids 50 and 51. Further, alternative embodiments may include only the elements associated with the fluid 50 or only those associated with fluid 51 to provide an output indicative of the shaft rotation. Further, only one mass and associated bellows, for example, mass 20 and bellows 21 is necessary if dynamic balancing is otherwise provided.

Referring now to FIG. 2, an alternative embodiment of the present invention will be described utilizing a number of the elements common to FIG. 1 wherein like reference characters indicate like elements with respect to FIG. 1. The masses 20 and 24 in addition to being connected to the movable ends of the bellows 21 and 25 respectively are also connected to a flapper 60 of a servo valve 61 on opposite sides of the flapper pivot 62 by means of rods 63 and 64 respectively. Preferably, the flapper is pivoted about an axis perpendicular to the axes 13 and 16. The end portions of the flapper 60 cooperate with nozzles 65 and 66. The nozzles 65 and 66 are directed to cause impingement of the fluid from their respective conduits 70 and 71 upon the flapper 60 in opposite directions with respect to each other. The conduits 70 and 71 connect through pressure reducing orifices 72 and 73 respectively to a common conduit 74 which in turn connects to a source of constant high pressure fluid. The conduits 70 and 71 also communicate with the conduit 30.

In the operation of the device of FIG. 2 with the shaft 10 at rest, the constant pressure fluid from the source is supplied through conduit 74 and reduced in pressure by the orifices 72 and 73 before being projected by the nozzles 65 and 66 to impinge upon the flapper 60. The flapper 60 will be in the position shown in the drawing when the shaft 10 is at rest. The fluid impinging upon the flapper 60 is exhausted through an opening 75 to the exterior atmosphere. The pressure within the bellows 21, 25 and 32 will be dependent upon the operation of the pressure reducing orifices 72 and 73 and the relative position of the flapper 60 with respect to the nozzles 65 and 66. For example, the pressure of the source may be 100 p.s.i. and this may be reduced to 50 p.s.i. by the action of the orifices 72 and 73. In this condition, the pointer 36 indicates zero angular velocity of the shaft 10 on the scale 37.

As the angular velocity of the shaft 10 increases, the masses 20 and 24 tend to radially move outward in a manner similar to that described with respect to FIG. 1. However, in this embodiment, the masses 20 and 24 remain in substantially the same position except for the movement necessary to position the flapper 60 to control the pressure of the fluid as will be explained.

As the masses 20 and 24 move radially outward, the left end of the flapper 60 moves closer to the nozzle 65 while the right end moves closer to the nozzle 66 thereby increasing the pressure in the conduits 70 and 71 respectively which in turn increases the pressure in the conduit 30 which communicates with the interior of the bellows 21 and 25. The pressure is increased in the bellows 21 and 25 to balance the tendency of the masses 20 and 24 to rotate outwardly under centrifugal action until a steady state condition is reached. This increased pressure is also sensed by the bellows 32 by means of conduit 31 and as described above the pointer 36 cooperates with the scale 37 to provide an indication of the angular velocity or the square thereof of the shaft 10.

In this embodiment it will be appreciated that only one mass and bellows and nozzle, for example, mass 20, bellows 21 and nozzle 65 is necessary if dynamic balancing is otherwise provided.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. An angular velocity signal generator for detecting the angular velocity of a rotating member comprising a mass rotating with said member for producing a centrifugal force proportional to the square of the angular velocity of said member, a first enclosed bellows having one end fixed with respect to said member at a first predetermined distance from the axis of rotation of said member, a second enclosed bellows having one end fixed with respect to said member at a second predetermined distance from the axis of rotation of said member, the other ends of each of said first and second bellows being flexible and connected to said mass, a first fluid in said first bellows, a second fluid in said second bellows, said fluids producing a pressure on said mass that results in a force equal and opposite to said centrifugal force, means including third bellows responsive to said first pressure fluid for providing a first signal representative of a function of the angular velocity of said member, and means including a fourth bellows responsive to said second pressure fluid for providing a second signal representative of a function of the angular velocity of said member.

2. A signal generator as claimed in claim 1 wherein said first fluid increases in pressure with increasing angular velocity of said member and said second fluid decreases in pressure with increasing angular velocity of said member.

3. An angular velocity signal generator for detecting the angular velocity of a rotating member comprising a pair of masses rotating with said member, each mass producing a centrifugal force proportional to the square of the angular velocity of said member, a first pair of bellows, each of said first bellows having one end fixed with respect to said member at a first predetermined distance from the axis of rotation of said member, a second pair of bellows, each of said second bellows having one end fixed with respect to said member at a second predetermined distance from the axis of rotation of said member, each of said bellows having a flexible end, one of said masses connected to the flexible ends of one of said first and second bellows and the other of said masses connected to the flexible ends of the other of said first and second bellows, a first fluid in said pair of bellows, a second fluid in said second pair of bellows, said fluids producing a pressure on said masses that results in a force equal and opposite to said centrifugal force, means including a third bellows responsive to said first pressure fluid for providing a first signal representative of a function of the angular velocity of said member, and means including fourth bellows responsive to said second pressure fluid for providing a second signal representative of a function of the angular velocity of said member.

References Cited in the file of this patent

UNITED STATES PATENTS

| | | |
|---|---|---|
| 476,550 | Pilet | June 7, 1892 |
| 1,384,314 | Fulton | July 12, 1921 |
| 2,599,797 | Wilson | June 10, 1952 |
| 2,865,624 | Skellern | Dec. 23, 1958 |

FOREIGN PATENTS

| | | |
|---|---|---|
| 572,340 | Canada | Mar. 17, 1959 |
| 1,017,512 | France | Sept. 24, 1952 |
| 100,943 | Germany | Jan. 20, 1899 |
| 578,560 | Great Britain | July 3, 1946 |
| 272,070 | Switzerland | Feb. 16, 1951 |